United States Patent [19]

Thorsen

[11] 4,008,134
[45] * Feb. 15, 1977

[54] EXTRACTION AND SEPARATION OF METALS FROM SOLIDS USING LIQUID CATION EXCHANGERS

[76] Inventor: Gunnar Thorsen, Steinhaugen 41, 7000 Trondheim, Norway

[ * ] Notice: The portion of the term of this patent subsequent to May 25, 1993, has been disclaimed.

[22] Filed: May 30, 1974

[21] Appl. No.: 474,853

[52] U.S. Cl. .............................. 204/108; 204/112; 204/119; 423/24; 423/27; 423/100; 423/109; 423/139; 423/140; 423/150; 75/101 R; 75/101 BE

[51] Int. Cl.² ...................... C25C 1/08; C25C 1/12; C25C 1/16; C01G 3/10

[58] Field of Search .......... 75/101 R, 101 BE, 117, 75/120; 423/24, 27, 100, 109, 54, 63, 139, 150, 140, 34, 35, 181, 658.5; 204/108, 112, 119

[56] References Cited

UNITED STATES PATENTS

| 2,860,031 | 11/1958 | Grinstead | 423/10 |
|---|---|---|---|
| 3,201,334 | 8/1965 | Ben-Bassat | 75/117 |
| 3,434,947 | 3/1969 | Steintveit | 75/120 |
| 3,438,767 | 4/1969 | Busch | 75/117 |
| 3,475,163 | 10/1969 | Watson et al. | 75/117 |
| 3,511,645 | 5/1970 | Goni | 75/120 |
| 3,607,069 | 9/1971 | Bruen | 75/101 R |
| 3,634,070 | 1/1972 | Lindstrom | 75/101 R |
| 3,663,163 | 5/1972 | De Pree et al. | 210/32 |
| 3,666,446 | 5/1972 | Cook et al. | 75/121 |

Primary Examiner—Oscar R. Vertiz
Assistant Examiner—Brian E. Hearn
Attorney, Agent, or Firm—Ladas, Parry, Von Gehr, Goldsmith & Deschamps

[57] ABSTRACT

Process for extraction and separation of metals utilizing the advantages of liquid-liquid extraction with cation exchangers without requiring the equivalent addition of alkali. The process is based on a combination of leaching the metal-containing raw materials with an organic acid (cation exchanger) and a subsequent use of the formed metal cationic complex in a liquid-liquid extraction process. In the said extraction process, the organic solution of metal complexes is used to recover and separate metal ions from an aqueous solution of metal salts.

13 Claims, 3 Drawing Figures

EXTRACTION AND SEPARATION OF METALS FROM SOLIDS USING LIQUID CATION EXCHANGERS

It is known that liquid organic cation exchangers such as fatty acids, naphthenic acids and other carboxylic acids, and alkyl-phosphoric acids such as di(2-ethylhexyl) phosphoric acid (DEHPA) can be used for the extraction and separation of metal ions from aqueous solutions by complex formations between the metal ions and the said organic components. When the organic active extractants are dissolved in an organic solvent (diluent) which is insoluble in the aqueous phase, a contacting between the organic phase and the aqueous phase causes the formation of an organo-metallic complex between the active organic extractant and the metal ion in the aqueous phase. The said metal complex is soluble in the organic phase, but not in the aqueous phase and the metal is in this manner extracted into the organic phase.

The formation of the metal complex takes place by a cation exchange, whereby an equivalent amount of protons from the organic acid are released corresponding to the amount of metal extracted from the aqueous phase. This leads to a corresponding decrease in pH in the aqueous phase. The formation of the metal cationic complex will primarily be related to the pH of the aqueous phase and will take place only above a certain pH value. As a general rule, in the case of carboxylic acids, it can be assumed that the lower limit for extraction of metal ions is somewhat lower than the pH value whereby the respective metals are precipitated as hydroxides.

This dependency on the pH allows the extraction to take place selectively, and the separation of the metals is obtained by adjustment of the pH in the aqueous solution.

As regard to alkyl-phosphoric acids, these are generally capable of extracting metal ions at lower pH values than the carboxylic acids. Furthermore, special effects may occur such as inversion of the selectivity for copper and zinc on transition from a carboxylic acid to alkyl-phosphoric acid as a cation exchanger.

As a principle rule, however, the extraction of metal ions with cation exchangers in their acid form causes an equivalent amount of protons to be released and only a very limited amount of metal ions can be extracted, therefore, before the lower pH value is reached and the extraction ceases. This can be counteracted by neutralizing the released protons by a supply of alkali to the system. The pH is thus kept at a value where the extraction of metal ions can continue.

In practice, however, this means that the use of the above said cation exchangers for extraction of metal ions will in many cases be prohibitive or will not permit economic advantages in relation to a precipitation reaction, since the process requires an equivalent addition of alkali, corresponding to the amount of metal extracted.

In accordance with the invention, a process is provided which utilizes the advantages of the described liquid-liquid extraction with cation exchangers without requiring the equivalent addition of alkali which is normally considered prohibitive or as a significant economic burden. This is achieved in that the leaching of the metals from the solid metal-containing raw materials takes place primarily with organic acid (the above said cation exchangers). As is known, the conventional technique for extracting metal values by leaching is to use a mineral acid such as for instance sulphuric acid which gives aqueous metal salt solutions.

The inventive idea is based on a combination of leaching the metal-containing raw materials with an organic acid (cation exchanger) and a subsequent use of the metal cationic complex formed thereby, in a liquid-liquid extraction process. In the said liquid-liquid extraction process, the organic solution of metal complexes is used to recover and separate metal ions from an aqueous solution of metal salts. The aqueous solution of metal ions normally originates from leaching the metal-containing raw materials with a mineral acid such as for instance sulphuric acid, whereby a number of metals can be dissolved.

Figure 1:
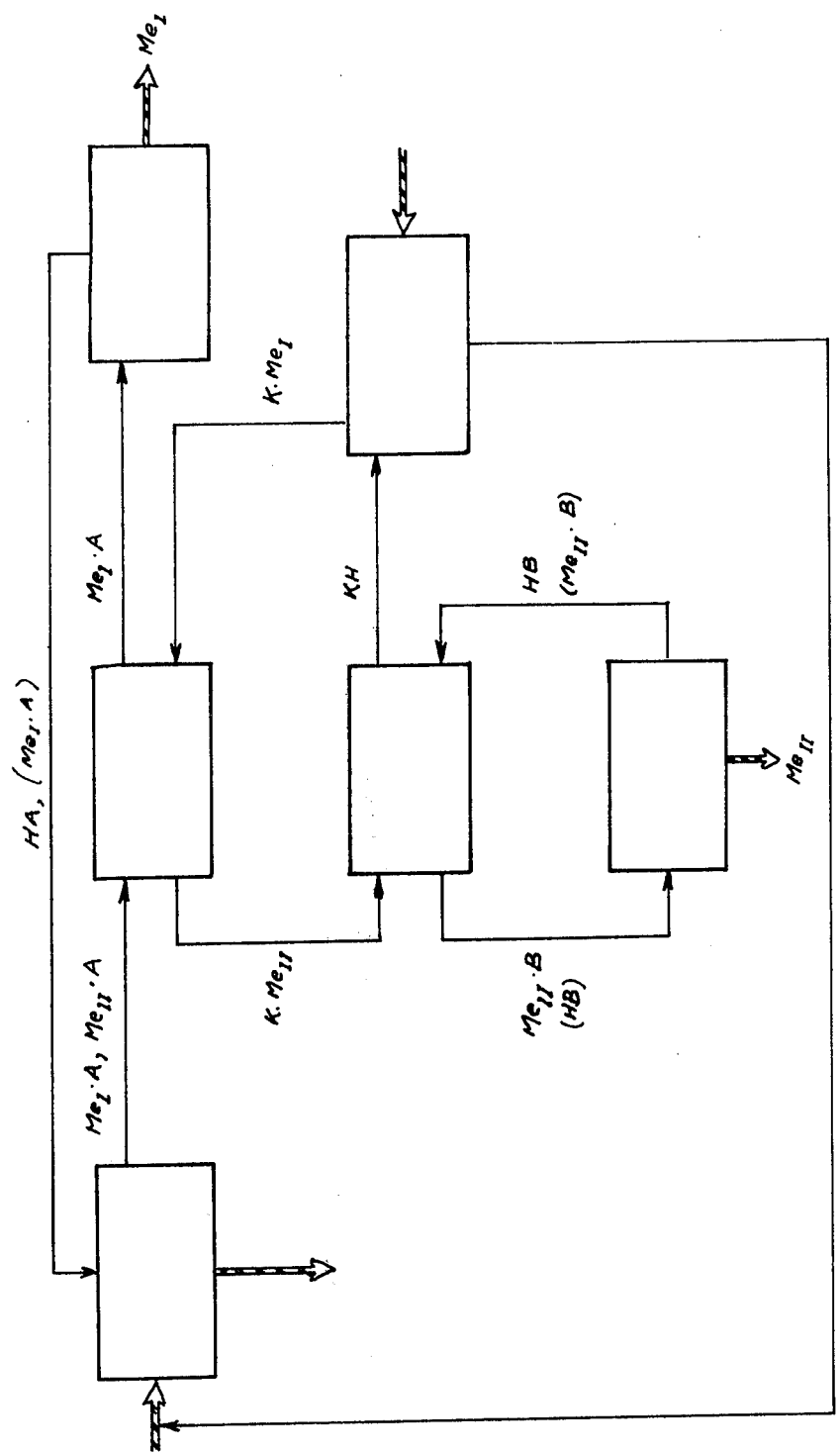
FIG. 1 illustrates the dissolution of two metals by the liquid cation exchanger.

Reference is made to FIG. 1, which illustrates the principle of the process described. In order to simplify the description, it is assumed on the Figure that only two metals are dissolved by leaching of the metal-containing raw materials. There is, however, in principle no limitation to the number of metals which can be recovered and separated by the use of the present invention.

In the reaction between the solid metal-containing raw materials and the liquid cation exchanger, preferably the most basic metal ($Me_I$) in the raw material will react with the cation exchanger (KH) thus forming the metal cationic complex ($K.Me_I$). By the subsequent liquid-liquid extraction process the least basic metal ($Me_{II}$) will be extracted into the organic phase by exchange with the metal $Me_I$, which passes into the aqueous phase. The aqueous phase is thus enriched in the metal $Me_I$ during the extraction process, $Me_{II}$ being exchanged at the same time to the organic phase.

If, in addition to the metals $Me_I$ and $Me_{II}$, the aqueous phase also contains other metals, the metals may be extracted separately, optionally in groups, by a suitable division of the organic phase and adaption of the number of extraction stages within the technical procedure of the extraction process.

If the aqueous phase is containing free mineral acid, the said free acid can be neutralized to a suitable extent by a corresponding increase in the amount of organic phase which is brought into contact with the aqueous phase during the extraction process. Protons in the aqueous phase will then be extracted by an exchange with the basic metal from the organic phase.

It may also be pointed out that it is normally advantageous to dissolve as much as possible of the metals during the primary leaching of the solid material with the organic phase. Excess of metal complex in the organic phase can be stripped directly with a mineral acid. The ideal system would thus be to obtain quantitative leaching of the valuable metals by the organic phase, whereafter the metals are separated by selective stripping from the organic phase with a mineral acid such as for instance sulphuric acid.

According to FIG. 1, it is assumed, for example, that the metals are deposited from the stripping solution in their metallic form by electrolysis. A number of alternative methods for preparing these aqueous metal salt solutions by reduction and depositing processes are possible and have to be evaluated in each single case. By carrying out the stripping process with excess of a strong mineral acid, it is thus possible to achieve direct precipitation of metal salts by the stripping process.

It may also be possible to precipitate metal salts directly from the organic phase by contacting and stripping with a gaseous phase such as for instance hydrogen chloride, carbon dioxide, and sulphur dioxide.

The invention thus relates to a process for extraction and separation of metals from a solid metal-containing raw material and from an aqueous solution in the presence of or without free mineral acid, using a liquid cation exchanger dissolved in a suitable organic solvent, by the combination of leaching the metal-containing raw material with the liquid cation exchanger and a subsequent stripping process and/or a liquid-liquid extraction process, the process being characterized in that the liquid cation exchanger in the organic phase is contacted with and reacts with the solid metal-containing raw material, whereby one or more metal cationic complexes are formed which are contacted with a mineral acid for stripping of the metals from the metal complexes, or the organic phase, which contains the metal complexes, is used in a subsequent liquid-liquid extraction process for recovery and separation of metal ions from a aqueous solution of metals.

As will be clear from FIG. 1, the invention leads to a closed process procedure with the possibility of quantitative recovery of the valuable metals in the metal-containing raw materials, some of the raw materials which do not react with the liquid cation exchanger being brought to a final leaching with a mineral acid or another aqueous leaching liquid.

In the following, it will be illustrated by examples how the invention can be utilized within the hydrometallurgic production of zinc, when the metal-containing raw materials are present in the form known as "calcine" produced by roasting sulphide concentrates. In this case, the zinc oxide content of the calcine reacts with the organic acid during formation of a metal complex of zinc which is thereafter used for removing ferric ions from the acid zinc sulphate solution within the hot leaching stage of the process.

The general principle of the invention can, however, be utilized within any hydrometallurgic process where it is possible to produce the organic metal complex by a reaction between a solid metal-containing raw material and the active liquid organic cation exchanger. In the existing hydrometallurgic processes, reference can be made by way of example to refining and purification of metals such as copper, nickel, cobalt and zinc from sulphide or oxide ores. With sulphide ores, the raw material is most frequently roasted beforehand to metal oxides (calcine), which is the most obvious starting material in the present invention.

If the metal-containing raw material is a metallic waste product, such as for instance an alloy of various metals, or a cementation product of metals such as obtained from the purification step within the hydrometallurgical production of zinc, an oxidising treatment of this material will give a mixture of metal oxides which can be extracted and separated by the process according to the invention.

When the process according to the invention is utilized, for example, in the hydrometallurgic production of zinc, where, as is known, zinc oxide in the calcine is dissolved in sulphuric acid and zinc deposited by electrolysis, the process can be used for removal of iron from the zinc sulphate solution without entailing any use of alkali or other additives. This is further elucidated in the following where, for example, it is assumed that the liquid cation exchanger is a commercial carboxylic acid such as for instance "Versatic 911" (Shell), described hereinbelow as "Versatic", and is present as a solution in a suitable organic solvent such as for instance "Shellsol TD".

Figure 2:
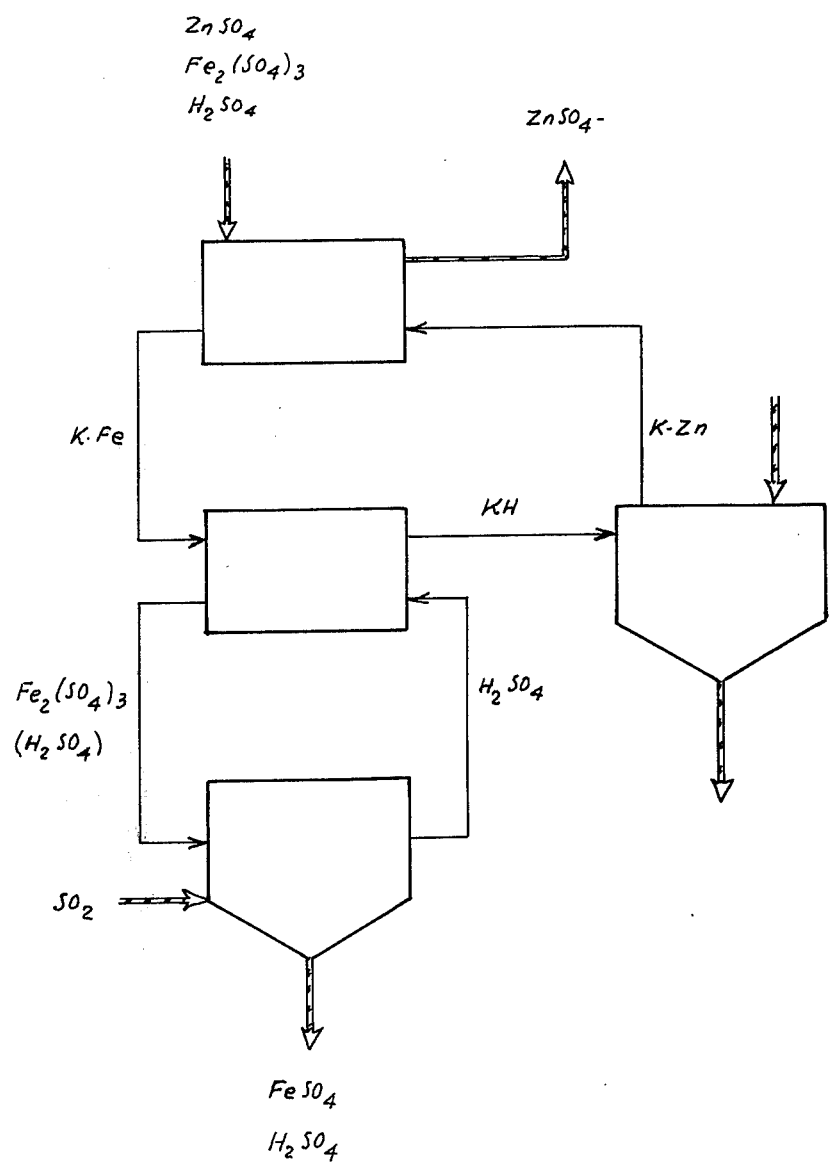
FIG. 2 shows the dissolution of zinc calcine by the organic phase, and subsequent transfer of zinc to the aqueous phase.

Reference is made to FIG. 2, which illustrates the principle of the process described hereinbelow. On the Figure, KH corresponds to "Versatic" acid.

Versatic in its acid form, is reactive to solid zinc oxide (calcine). By the reaction, a metal complex is formed between zinc and Versatic (Zn-Versatic). By a subsequent contacting between the zinc-containing organic phase and an iron-containing aqueous zinc sulphate solution, an exchange between zinc and iron takes place. The iron is thereby transferred to the organic phase where it will be present as the metal complex Fe-Versatic. By this exchange, an equivalent amount of zinc passes from the organic phase into the aqueous zinc sulphate solution. In this manner, the iron is removed quantitatively from the zinc sulphate solution by contact between the two immiscible phases in one or more stages depending on the technical procedure of the liquid-liquid extraction process.

Subsequent to the extraction, iron may be stripped from the organic phase by contacting with sulphuric acid or another mineral acid in one or more stages. The liquid cation exchanger (Versatic) will thereby be regenerated into its acid form and will again be ready to be loaded with zinc on reaction with the solid zinc oxide (calcine).

As will be clear from the above described process, the raw material, in this case zinc oxide, serves as an alkali in the process and any use of extra chemicals is unnecessary. By the reaction between Versatic and calcine, zinc is dissolved in the organic phase and will later be deposited as metal by the electrolysis after it has been transferred to the aqueous phase by the liquid/liquid extraction stage.

In Norwegian Pat. No. 108.047, a process for separating iron from metal sulphate solutions and a hydrometallurgic process for production of zinc are described. Reference is made to this patent in regard to the conventional process for hydrometallurgic production of zinc.

In the above said patent, it is stated that the leaching of calcine with sulphuric acid takes place in two stages, the first stage being characterized as a neutral leaching and the second stage as an acid leaching.

In the first stage, calcine is added in excess, so that the leaching is relatively mild. In this manner, the iron is not dissolved, and a zinc sulphate solution free from iron is obtained. The remaining residue of calcine will contain a significant amount of zinc, however, bound to iron in the form of zinc ferrites. In order to increase the total zinc yield, the said residue is subjected to a strong leaching, heating with excess of sulphuric acid, the so-called acid leaching. The remaining zinc amount will thereby be dissolved, significant amounts of iron will, however, accompany the solution.

In Norwegian patent No. 108.047 it is illustrated how the said iron may be deposited as a basic sulphate in acid solution by the presence of cations such as $K^+$, Na+ or NH$_4^+$. The said deposition product is called jarosite and the said patent gives the basis of the so-called jarosite process within the hydrometallurgic production of zinc. The process is used in a number of zinc plants, and one of the advantages of the process in view of previous processes resides in the fact that iron is not the restricting factor for the leaching yield on acid treatment of calcine.

The process according to the invention which is based on the combination of the reaction between the calcine with a liquid organic cation exchanger and a subsequent liquid-liquid extraction for removal of iron from the zinc sulphate solution by means of the organo-metallic zinc complex formed, is particularly suitable for the hydrometallurgic production of zinc. The starting point of the invention can be based on the leaching method in two stages which forms the basis of the jarosite process.

The process according to the invention has obvious advantages in view of the jarosite process, however, since it is not necessary to add any chemicals such as ammonia to form a deposition product. Further, in the present process, it is possible to remove iron from the process cycle in alternative forms. The stripping of the charged organic Fe-Versatic is a very flexible stage, where it is possible, for example, to produce a suitable starting material for further treatment of iron to a high-valent iron powder or electrolyte iron. The iron can be crystallized as iron sulphate directly within the stripping stage where the concentration of iron sulphate can be maintained close to the saturation concentration. If the crystallization is more advantageous as bi-valent iron sulphate, the iron can be reduced, for example, with sulphur dioxide prior to deposition.

There are no limits in principle to the amount of iron which can be removed from the zinc sulphate solution. It is also emphasized that excess of free sulphuric acid from the strongly acid solution can be neutralized as a step in the liquid/liquid extraction process. This means that a preceding partial neutralization with calcine, which is a conventional practice in iron deposition in the jarosite process, becomes unnecessary. The zinc yield, and the recovery of the remaining metals in the ores, is limited only by the degree to which it is possible to dissolve the metals by the leaching process.

A particular advantage of the process according to the invention is that it has no adverse environmental effects.

It is also emphasized that removal and separation of metals other than iron from the zinc sulphate solution can readily be undertaken by the extraction process. It is particularly mentioned that copper can be extracted in accordance with the same principle described hereinabove for the extraction of iron. A mixture of copper, zinc and iron may thus be separated in that the organic solution with zinc as a metal complex is firstly used for extraction of iron and thereafter for extraction of copper. This will be further apparent from the fields of utilization described hereinbelow for treatment of mine water.

If copper is the main component in the metal-containing raw material, the copper will react with the organic cation exchanger and can thus be used in the same manner as the organic zinc complex for liquid/liquid extraction of iron from a metal salt-solution.

It is emphasized that the process according to the invention is not restricted to hydrometallurgical production of zinc and copper, but comprises all fields where it is possible to use the described combination of leaching of a metal-containing solid raw material with a liquid organic cation exchanger and a subsequent liquid/liquid extraction for recovering and separation of the metals from the aqueous solution occuring by conventional leaching of the raw material with mineral acid.

The described combination of leaching and liquid-liquid extraction can also be used in connection with separation and recovery of metal ions from solutions which are not directly connected with the production of metals from a solid raw material. As an example may be mentioned metal-containing waste water and used pickling baths from chemical surface treatment within the metal industry and other metal-containing wastes, for example, from pyrite mines.

In these cases, the solid material, which is reactive with the organic acid (cation exchanger), must, however, be added to the process cycle in the form of, for example, lime. If the metal solution is on a sulphate basis, gypsum will be deposited equivalent to the metals recovered.

This process is suitable, for example, for recovery and separation of metal values from mine water, where a typical composition can be given, for example, as 0.5 – 1.0 g/l copper, 1 – 2 g/l zinc and 5 – 6 g/l iron.

Figure 3:
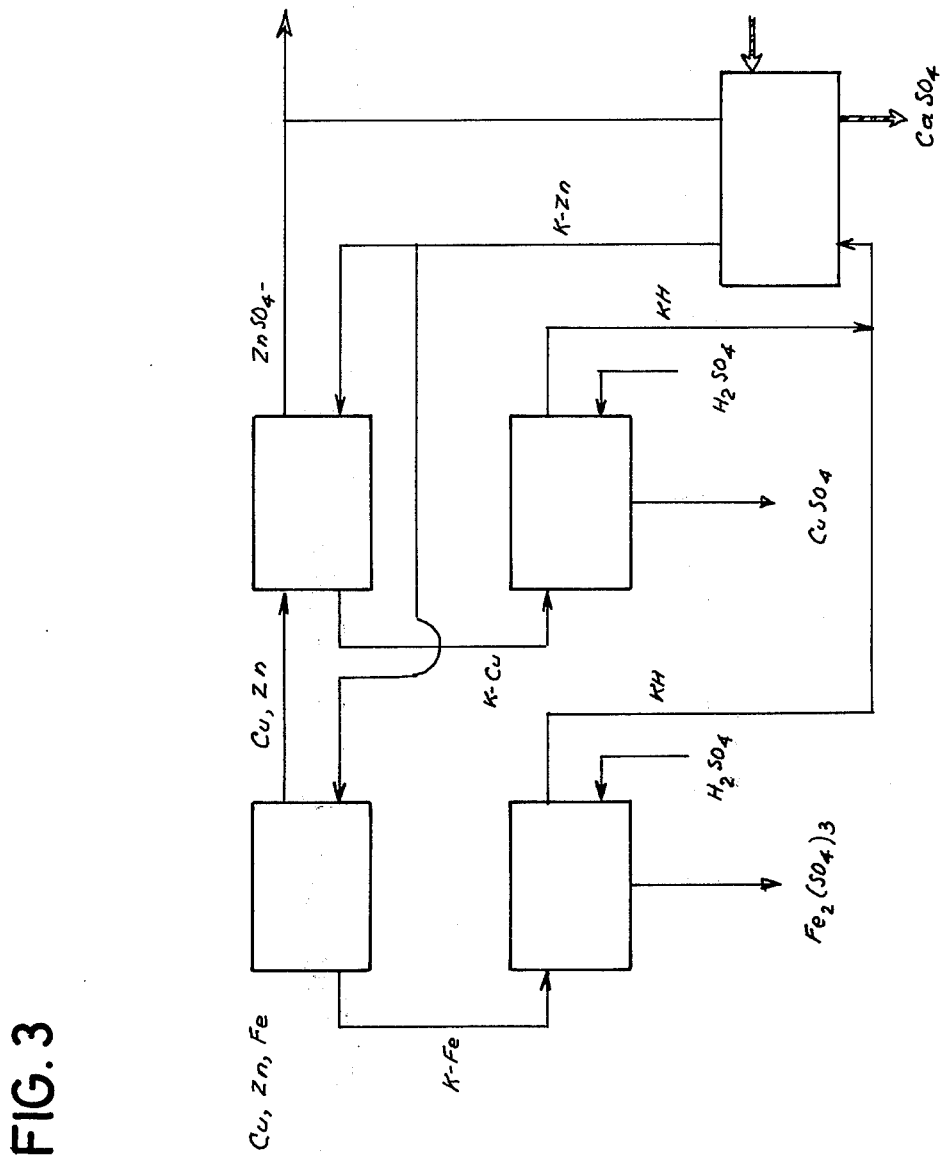
FIG. 3 is a process diagram for recovery and separation of copper, zinc, and iron from mine water.

FIG. 3 illustrates by way of example a process diagram for recovery and separation of copper, zinc and iron from mine water, where the metals are present as sulphates. As an extraction component the "Versatic" acid can be used, for example. In a first stage of liquid-liquid extraction, iron will be separated from the mixture and, in a next stage, copper can be separated from zinc. The remaining zinc sulphate solution will have a zinc concentration which is equivalent to the original total concentration of zinc, copper and iron and possible free sulphuric acid. From this zinc sulphate solution, a branch stream can be treated with lime. In this step the organo-metallic zinc complex used in the liquid-liquid extraction process will be formed.

If the present process is used for treatment of pickling baths which contains relatively high concentrations of zinc and iron in a mixture, the previously mentioned Zn-Versatic complex can, for example, be used in a liquid-liquid extraction for separation of iron from the pickling bath. After this treatment, the bath will consist of a zinc salt solution from which zinc can be deposited and recovered in a pure state.

The invention is further described in the following by means of examples.

EXAMPLE I 200 g technical calcine produced by roasting of zinc sulphide concentrate was contacted with 1 liter of an organic phase consisting of 30% Versatic 911 dissolved in Shellsol TD. After agitation for 20 minutes at 50° C, the solid phase and the liquid phase were separated. The organic phase then had a zinc concentration of 40 g/l.

In a stirring vessel, 100 ml of an aqueous sulphate solution containing 120 g/l zinc and 18 g/l iron were contacted with 317 ml of the above said 30 % Versatic solution. 83 ml of the zinc loaded Versatic solution containing 40 g/l zinc were gradually added and after a contact period of 1 hour at 20 ° C, the aqueous and organic phases were separated.

Analysis of the two phases showed the following results:

Aqueous phase: 152.0 g/l Zn; 0.3 g/l Fe.
Organic phase: 0.4 g/l Zn; 4,42 g/l Fe.

EXAMPLE II

From an aqueous sulphate solution containing 120 g/l zinc and 18 g/l iron, the iron was extracted by continuous operation in an apparatus consisting of three mixer-settlers in series at a temperature of 50° C. The organic phase was divided into two streams, a pure 30 % Versatic solution (Org.-1 ) and a zinc loaded 30 % Versatic solution (Org.-2 ) containing 40 g/l zinc. The organic solvent (diluent) was Shellsol TD.

The aqueous phase and the Org.-1-solution was added to the first and last stage, respectively, while the org.-2solution was distributed over the three stages. Relative volumetric proportions of the feed streams:

Aqueous: Org.-1 : Org.-2 = 1 : 2.2 :0.8.

The resulting aqueous zinc sulphate solution contained 152 g/l Zn, and less than 0.1 g/l Fe.

EXAMPLE III

From a sulphate solution containing 120 g/l zinc and 18 g/l iron with 15 g/l free sulphuric acid, both the iron and the free protons were extracted by continuous operation in a corresponding manner to that of example II. Relative volumetric proportions of the feed streams:

Aqueous: Org.-1 : Org.-2 = 1 : 1.8 : 1.2.

The resulting aqueous zinc sulphate solution contained 169 g/l Zn and less than 0.1 g/l Fe.

EXAMPLE IV 100 g metal oxide was contacted with 1 liter of an organic phase consisting of 30 % cation exchanger dissolved in Shellsol TD. After stirring for 20 minutes at 50° C, the solid phase and the liquid phase were separated and the metal concentration measured in the organic phase.

The results are given in the following table 1.

Table 1

| | Metal Concentration, g/l, in Organic Phase after Contact with Metal Oxides. | |
|---|---|---|
| | Cation Exchanger | |
| Metal oxide | Versatic 911 | Di-ethyl-hexyl-phosphoric acid (DEHPA) |
| CuO | 1.56 | 0.53 |
| Ni$_2$O$_3$ | 1.50 | 0.57 |
| NiO | 0.22 | 0.15 |

EXAMPLE V

A mixture of 75 g ZnO and 75 g CuO was contacted with 1 liter of organic phase consisting of 10 % Versatic 911 in Shellsol TD. After stirring for 20 minutes at 50° C, the organic phase contained 27 g/l Zn and 0.02 g/l Cu.

EXAMPLE VI

A mixture of 25 g Ni$_2$O$_3$ and 25 g CuO was contacted at 30° C with the organic phase as in example V. The metal concentration in the organic phase after 20 minutes was 0.35 g/l Ni and 0.03 g/l Cu.

EXAMPLE VII

To 1 liter zinc sulphate solution containing 15 g/l Zn an equivalent amount of solid calcium hydroxide corresponding to 9.2 g Ca was added. After stirring for 5 hours at 20° C, the sediment was filtered from the aqueous phase.

The filter cake which consisted of gypsum and deposited zinc hydroxide was divided into two equal-sized parts and transferred to two stirring vessels. The two parts were contacted with 400 ml of 30 % Versatic 911 and 30 % DEHPA dissolved in Shellsol TD, respectively. After stirring for 30 minutes at 20° C, the concentrations of zinc in the two organic solutions were:

30 % Versatic 911 : 15.1 g/l Zn.
30 % DEHPA : 14.9 g/l Zn.

Having described my invention, I claim:

1. A process for the hydrometallurgic production of at least one desired metal consisting of copper, nickel, cobalt or zinc, from an iron-containing raw material selected from the group consisting of oxide ores, metal oxide waste products and roasted sulphide ores, which comprises leaching solid concentrates of said raw material with an organic liquid phase consisting of a cation exchanger component selected from the group consisting of organic carboxylic acids and alkyl phosphoric acids in solution in an organic solvent, thereby forming a complex between a portion of at least one desired metal and the cation exchanger component, separating the solids containing iron and the remaining desired metal from the organic liquid phase containing said complex, leaching the separated solids with aqueous sulphuric acid, thereby forming an iron-containing aqueous metal sulphate solution, extracting iron by contacting said sulphate solution with the separated organic liquid phase containing said complex, whereby iron is transferred to the organic phase and forms a complex with the cation exchanger component and the desired metal of said complex passes from the organic phase to said aqueous sulphate solution, and then recovering desired metals from said aqueous sulphate solution.

2. A process according to claim 1, wherein subsequent to extraction the organic phase containing iron is contacted with a mineral acid, whereby the iron is precipitated as a salt and the regenerated organic phase is recycled to the leaching of the solid concentrates of raw material.

3. A process according to claim 1, wherein subsequent to extraction the organic phase containing iron is contacted with a gas selected from the group consisting of hydrogen chloride, carbon dioxide and sulphur dioxide, whereby the iron is precipitated as a salt and the regenerated organic phase is recycled to the leaching of the solid concentrates of raw material.

4. A process according to claim 1, wherein said iron-containing raw material contains metal oxides selected from the group consisting of copper, zinc and iron oxides and mixtures thereof.

5. A process according to claim 1, wherein said iron-containing raw material is produced by roasting a concentrate selected from the group consisting of copper sulphide concentrates, zinc sulphide concentrates and mixtures thereof.

6. A process according to claim 1, wherein said iron-containing raw material consists of metal oxides produced by oxidizing metallic materials selected from the group consisting of waste metals and metals obtained from the purification of electrolyte solutions.

7. A process according to claim 1, wherein the desired metals are recovered from the aqueous sulphate solution, after extraction of iron, in metallic form by electrolysis.

8. A process according to claim 1, wherein the desired metals are recovered from the aqueous sulphate solution, after extraction of iron, in the form of metal salts.

9. A process for the hydrometallurgic production of zinc, which comprises leaching a solid zinc and iron-containing raw material, said raw material having been produced by roasting zinc sulphide concentrates, with an organic liquid phase consisting of a cation exchanger component selected from the group consisting of organic carboxylic acids and alkyl phosphoric acids in solution in an organic solvent, thereby forming a complex between a portion of the zinc and the cation exchanger component, separating the solids containing iron and the remaining zinc from the organic liquid phase containing said complex, leaching the solids with aqueous sulphuric acid, thereby forming an iron-containing aqueous zinc sulphate solution, extracting iron by contacting said sulphate solution with the separated organic liquid phase containing said zinc complex, whereby iron is transferred to the organic phase and forms a complex with the cation exchanger component and zinc passes from the organic phase to said aqueous sulphate solution, and then recovering zinc from said aqueous sulphate solution.

10. A process according to claim 9, wherein subsequent to extraction the organic phase containing iron is contacted with a mineral acid, whereby the iron is precipitated as a salt and the regenerated organic phase is recycled to the leaching of the solid concentrates of raw material.

11. A process according to claim 9, wherein subsequent to extraction the organic phase containing iron is contacted with a gas selected from the group consisting of hydrogen chloride, carbon dioxide and sulphur dioxide, whereby the iron is precipitated as a salt and the regenerated organic phase is recycled to the leaching of the solid concentrates of raw material.

12. A process according to claim 9, wherein zinc is recovered from the aqueous sulphate solution, after extraction of iron, in metallic form by electrolysis.

13. A process according to claim 9, wherein zinc is recovered from the aqueous sulphate solution, after extraction of iron, in the form of a zinc salt.

* * * * *